(12) United States Patent
Isono et al.

(10) Patent No.: US 10,317,730 B2
(45) Date of Patent: Jun. 11, 2019

(54) DISPLAY DEVICE HAVING BACKLIGHT WITH PROTRUSIONS FOR CAUSING REFLECTION SHEET TO BULGE UP

(71) Applicant: Panasonic Intellectual Property Management Co., Ltd., Osaka (JP)

(72) Inventors: Takamitsu Isono, Osaka (JP); Yasuhiro Kumamoto, Osaka (JP); Tadahiro Kugimaru, Osaka (JP); Kouji Terawaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 34 days.

(21) Appl. No.: 15/542,937

(22) PCT Filed: Feb. 2, 2016

(86) PCT No.: PCT/JP2016/000513
§ 371 (c)(1),
(2) Date: Jul. 12, 2017

(87) PCT Pub. No.: WO2016/136146
PCT Pub. Date: Sep. 1, 2016

(65) Prior Publication Data
US 2017/0351145 A1    Dec. 7, 2017

(30) Foreign Application Priority Data
Feb. 23, 2015  (JP) .................................. 2015-032990

(51) Int. Cl.
*G02F 1/13357* (2006.01)
*G02F 1/1335* (2006.01)
*F21S 2/00* (2016.01)

(52) U.S. Cl.
CPC .......... *G02F 1/133611* (2013.01); *F21S 2/00* (2013.01); *G02F 1/133603* (2013.01);
(Continued)

(58) Field of Classification Search
CPC ......... G02F 1/133605; G02F 1/133603; G02F 1/133602; F21Y 2105/00; F21Y 2105/10; F21Y 2105/16
(Continued)

(56) References Cited

U.S. PATENT DOCUMENTS 7,481,553 B2 *  1/2009  Kim ................... G02F 1/133605
                                                        362/238
7,497,592 B2 *  3/2009  Chou ................ G02F 1/133605
                                                        362/241
(Continued)

FOREIGN PATENT DOCUMENTS

CN      104266115 A      1/2015
JP      2005-285620     10/2005
(Continued)

OTHER PUBLICATIONS

The Extended European Search Report dated Feb. 23, 2018 for the related European Patent Application No. 16754902.1.
(Continued)

*Primary Examiner* — Ismael Negron
(74) *Attorney, Agent, or Firm* — McDermott Will & Emery LLP

(57) ABSTRACT

A display device includes a display panel, a plurality of light-emitting sources arranged in a matrix and mounted on a back plate to project light towards the display panel, a reflection sheet attached to the back plate and having holes into which the light-emitting sources are inserted, and a
(Continued)

plurality of protrusions formed on the back plate for causing portions of the reflection sheet to bulge out toward the display panel.

5 Claims, 8 Drawing Sheets

(52) U.S. Cl.
CPC .. *G02F 1/133605* (2013.01); *G02F 1/133606* (2013.01); *G02F 1/133608* (2013.01); *G02F 2001/133612* (2013.01)

(58) Field of Classification Search
USPC .......................................... 362/97.3, 249.02
See application file for complete search history.

(56) References Cited

U.S. PATENT DOCUMENTS

| | | | |
|---|---|---|---|
| 7,648,254 B2* | 1/2010 | Yoo | H05K 1/0206 362/249.01 |
| 8,474,992 B2* | 7/2013 | Takemura | G02F 1/133605 349/62 |
| 8,833,965 B2* | 9/2014 | Shimasaki | F21S 2/005 362/219 |
| 8,985,799 B2* | 3/2015 | Shimizu | G02F 1/133605 362/97.2 |
| 9,025,087 B2* | 5/2015 | Imajo | G02F 1/133605 348/790 |
| 9,165,487 B2* | 10/2015 | Nall | G09F 13/04 |
| 9,551,898 B2* | 1/2017 | Su | G02F 1/133605 |
| 9,709,849 B2* | 7/2017 | Lu | G02F 1/133605 |
| 2007/0236628 A1* | 10/2007 | Epstein | G02F 1/133605 349/67 |
| 2008/0037279 A1* | 2/2008 | Chan | G02F 1/133603 362/612 |
| 2010/0039440 A1 | 2/2010 | Tanaka et al. | |
| 2011/0109814 A1 | 5/2011 | Takemura | |
| 2011/0317095 A1 | 12/2011 | Shimizu | |
| 2012/0099050 A1 | 4/2012 | Kasai et al. | |
| 2012/0105763 A1 | 5/2012 | Takeuchi et al. | |
| 2012/0262631 A1 | 10/2012 | Kuromizu | |
| 2015/0029439 A1* | 1/2015 | Kim | G02F 1/133605 349/64 |
| 2016/0018698 A1 | 1/2016 | Su et al. | |

FOREIGN PATENT DOCUMENTS

| | | |
|---|---|---|
| JP | 2010-044180 | 2/2010 |
| JP | 2011-034076 | 2/2011 |
| JP | 2011-100648 | 5/2011 |
| JP | 2013-143218 | 7/2013 |
| WO | 2011/080979 | 7/2011 |

OTHER PUBLICATIONS

International Search Report of PCT application No. PCT/JP2016/000513 dated Apr. 26, 2016.

* cited by examiner

DISPLAY DEVICE HAVING BACKLIGHT WITH PROTRUSIONS FOR CAUSING REFLECTION SHEET TO BULGE UP

This application is a U.S. national stage application of the PCT International Application No. PCT/JP2016/000513 filed on Feb. 2, 2016, which claims the benefit of foreign priority of Japanese patent application 2015-032990 filed on Feb. 23, 2015, the contents all of which are incorporated herein by reference.

TECHNICAL FIELD

The present disclosure relates to a display device that displays an image such as a still image or a moving image.

BACKGROUND ART

There is a thin display device, such as a liquid crystal panel or an organic electroluminescence (EL) display panel, as a display device for a television or a monitor of a computer.

A liquid crystal display device is a display device that does not emit light by itself. Therefore, to allow a user to recognize an image even in a dark place, the liquid crystal display device includes a light-emitting source on a back surface (opposes a user) of a display panel provided to the display device so that light passing through the display panel reaches the user.

The display device of this type has a configuration in which point light-emitting sources (point light sources) including light emitting diodes (LEDs) are spaced and arranged in a matrix. Therefore, this display device may be provided with a reflection sheet for reflecting light, which is emitted from the light-emitting sources and then advances in a direction opposite to the display panel, toward the display panel.

For example, Patent Literature 1 discloses a display device including a reflection sheet mounted to a back plate to which light-emitting sources are mounted. The outer perimeter of this reflection sheet rises toward a light-emitting side of the light-emitting sources.

In the display device having the above-mentioned configuration, a diffusion plate for diffusing light is provided between the display panel and the light-emitting sources so that unevenness in luminance of light passing through the display panel is not caused and light passes through the display panel in a uniform light amount. In addition, the diffusion plate may be formed such that printing is performed on a (bright) region where light transmission amount is relatively large to ensure uniformity in an amount of light passing through the display panel.

CITATION LIST

Patent Literature

PTL 1: Unexamined Japanese Patent Publication No. 2013-143218

SUMMARY

Restriction in a light transmission amount through performing printing on the diffusion plate leads to ensuring uniformity in an amount of light with luminance of a display panel being reduced, and this results in causing energy waste. In addition, a step of performing printing is needed in a manufacturing process, which makes the process for manufacturing the display device complicated.

The present disclosure provides a display device having excellent luminous efficiency in which unevenness in luminance of a display panel can be suppressed with the luminance of the display panel being kept high.

The display device of the present disclosure includes a display panel that displays an image, a plurality of light-emitting sources, a back plate to which the light-emitting sources are mounted, and a reflection sheet. The plurality of light-emitting sources radiates light toward the display panel from a back surface side of the display panel, and is arranged in a matrix along the display panel. The reflection sheet is attached to the back plate, provided with insertion holes into which the light-emitting sources are inserted, and reflects light radiated from the light-emitting sources. The back plate has a plurality of protrusions that causes portions of the reflection sheet to bulge out toward the display panel with the reflection sheet being attached to the back plate.

The display device of the present disclosure can reduce unevenness in luminance while ensuring high luminance.

DESCRIPTION OF EMBODIMENTS

Exemplary embodiments below merely describe one example of a display device of the present disclosure. Therefore, the present disclosure is not limited only to the exemplary embodiments described below.

In addition, the drawings are conceptual sketches to which emphasis, omission, and proportional adjustment are made appropriately to illustrate the present disclosure, and may not reflect actual shapes, positional relations, and proportions.

Throughout the drawings, substantially identical components will be denoted by identical reference marks.

Hereinafter, exemplary embodiments will be described in detail with reference to the drawings as necessary. However, more than necessary detailed descriptions will be sometimes omitted. For example, detailed descriptions for matters which have already been well known and redundant descriptions for substantially the same configurations will be sometimes omitted. This is to prevent the description below from becoming unnecessarily redundant to facilitate understanding of a person skilled in the art.

Note that the accompanying drawings and the following description are provided in order for a person of ordinary skill in the art to sufficiently understand the present disclosure, and they are not intended to limit the subject matter set forth in the claims.

First Exemplary Embodiment

[1-1. Outline of Configuration of Display Device]

Figure 1:
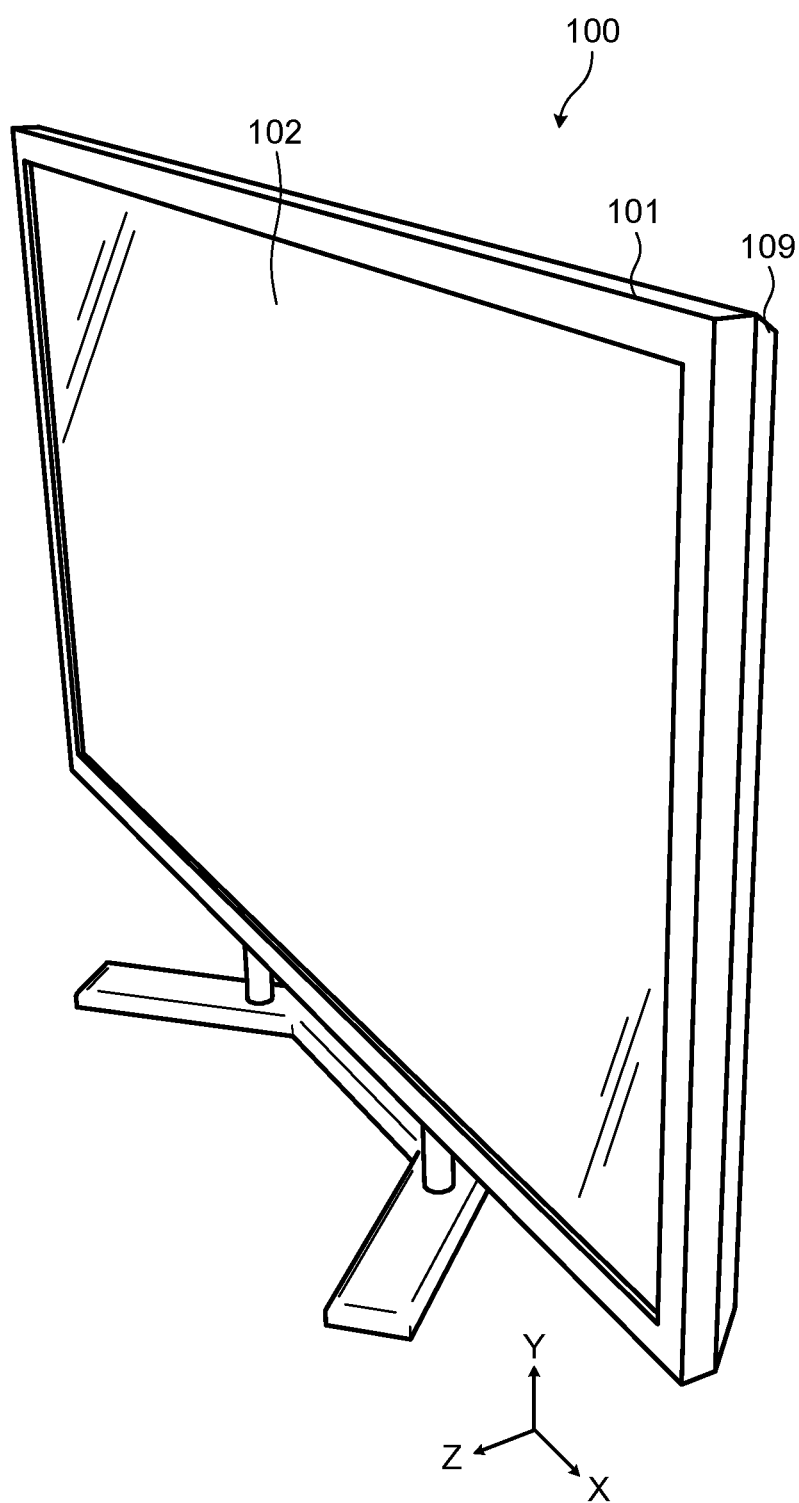
FIG. 1 is a perspective view schematically illustrating one example of an external appearance of a display device according to a first exemplary embodiment.

FIG. 1 is a perspective view schematically illustrating one example of an external appearance of display device 100 according to the first exemplary embodiment.

Figure 2:
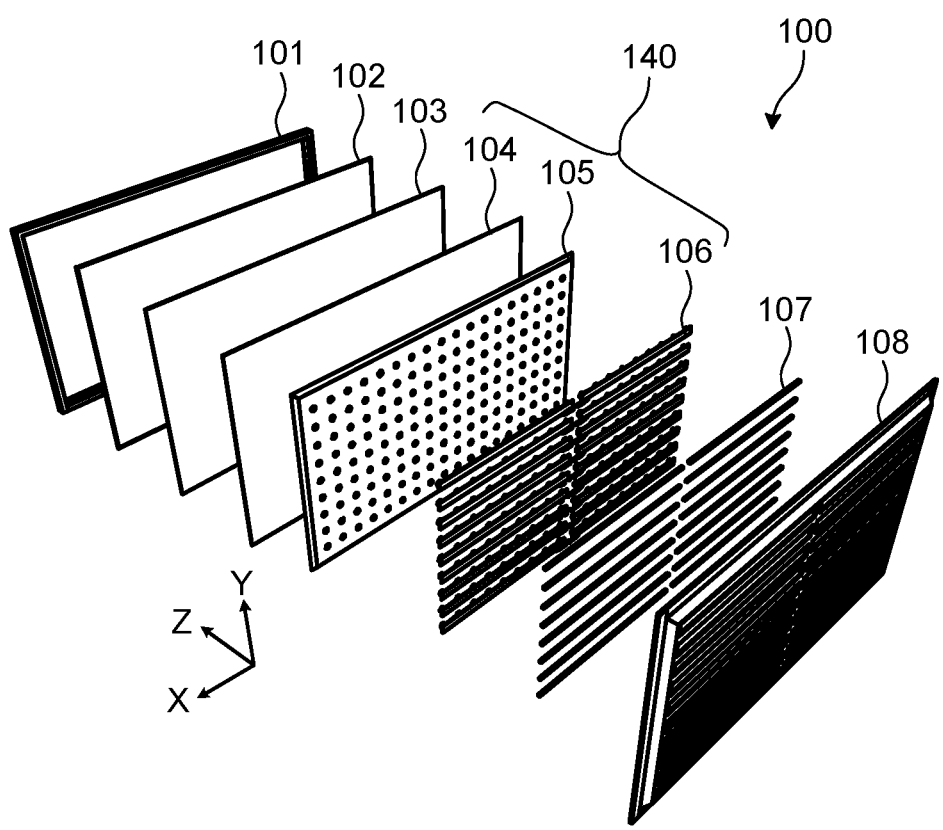
FIG. 2 is an exploded perspective view schematically illustrating one example of a structure of the display device according to the first exemplary embodiment.

FIG. 2 is an exploded perspective view schematically illustrating one example of a structure of display device 100 according to the first exemplary embodiment.

Noted that these drawings schematically illustrate an outline configuration of display device 100, and the details are omitted.

Note that XYZ axes are used below for the description as necessary. In the present exemplary embodiment, a direction parallel (substantially parallel) to a longer side direction of display device 100 is defined as an X axis direction, a direction parallel (substantially parallel) to a shorter side direction of display device 100 is defined as an Y axis direction, and a direction orthogonal to the X axis and the Y axis is defined as a Z axis direction, for the sake of convenience. In addition, a vertical direction with respect to an XZ plane, that is, the Y-axis direction, is a direction of gravitational force. Under a normal use condition, display device 100 is supposed to be installed on an installation surface parallel (substantially parallel) to the XZ plane. Further, a side of display device 100 facing a user (not illustrated) viewing display device 100 is defined as a "front side", a side opposite to the front side is defined as a "back side", a side relatively distant from the installation surface in the Y-axis direction is defined as "upper (or top) side", and a side relatively close to the installment surface in the Y-axis direction is defined as "lower (or bottom) side". Note that these directions are given as relative directions for descriptive purpose but not absolute ones.

Display device 100 includes frame 101, front member 102, display panel 103, light-emitting unit 140, protrusions 107, back plate 108, and back cover 109.

Display device 100 described in this exemplary embodiment is a television that outputs images or sounds obtained from received broadcast waves, or the like, and contains a circuit board (not illustrated). Noted that the configuration as a television is substantially identical to a commonly known configuration, so that the description thereof will be omitted.

Frame 101, front member 102, and back cover 109 are components that cover display panel 103, light-emitting unit 140, and the like. Frame 101 is a member that protects an outer perimeter of display panel 103, and the like. Front member 102 is a transparent member that covers the front surface of display panel 103. Back cover 109 is a member that protects back surfaces of display panel 103, and the like.

Display panel 103 is a device that displays an image based on an input video signal. The image includes a still image, a moving image, and the like, and also includes characters, symbols, and the like. Display panel 103 described in this exemplary embodiment is a liquid crystal display panel. In addition, the thickness of display panel 103 is about 1 mm to 3 mm, for example. Note that the type of display panel 103 is not particularly limited in the present disclosure. Display panel 103 may be the one that needs light passing through display panel 103 when an image is displayed.

[1-1-1. Light-Emitting Unit]

Light-emitting unit 140 is a component for radiating light with substantially uniform luminance to the back surface of display panel 103, and generally called a "backlight" or the like. Light-emitting unit 140 includes diffusion plate 104, reflection sheet 105, and light-emitting modules 106.

Figure 3:
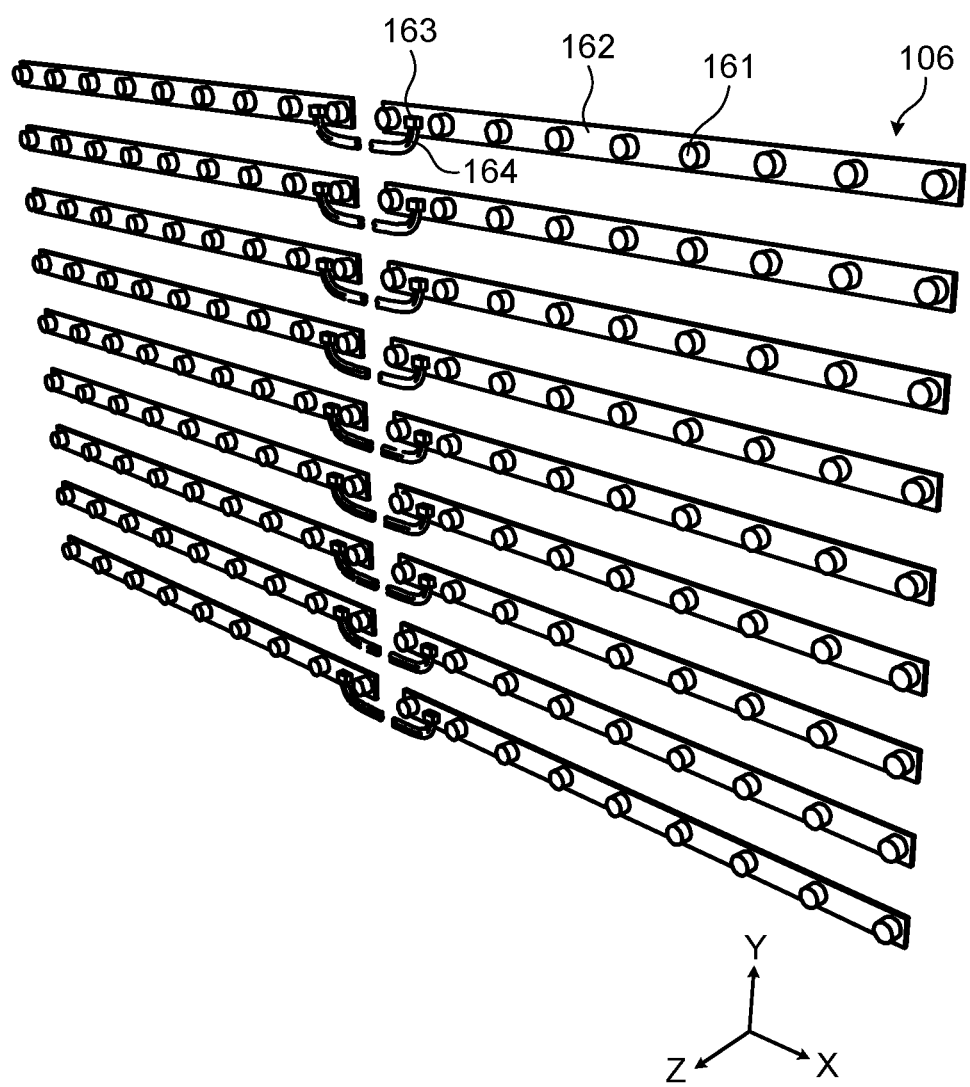
FIG. 3 is a perspective view schematically illustrating one example of light-emitting modules according to the first exemplary embodiment.

FIG. 3 is a perspective view schematically illustrating one example of light-emitting modules 106 according to this exemplary embodiment.

As illustrated in FIG. 3, each of light-emitting modules 106 is configured such that several of a plurality of light-emitting sources 161 in display device 100 is mounted to wiring board 162. Light-emitting module 106 is provided so that light-emitting sources 161 can be easily disposed on back plate 108. For example, light-emitting sources 161 can be arranged in a matrix along display panel 103 by mounting light-emitting modules 106 as illustrated in FIG. 3.

Each of wiring boards 162 has connector 163 to which electric line 164 is to be connected. In addition, each of wiring boards 162 has a conductive member (for example, printed wiring) that electrically connects connector 163 and light-emitting sources 161. On each of wiring boards 162, electric power supplied from electric line 164 connected to connector 163 is supplied to light-emitting sources 161 mounted to each of wiring boards 162. Thus, light-emitting sources 161 mounted to wiring boards 162 are turned on.

In addition, a layer having light reflectivity higher than a body of each of wiring boards 162 is formed on a surface on which light-emitting sources 161 are mounted, among a plurality of surfaces of wiring board 162. Each of wiring boards 162 according to this exemplary embodiment has a white resist film as a layer having higher light reflectivity, for example. According to this configuration, even when a diameter of each insertion hole (described later) formed on reflection sheet 105 (see FIG. 2) is larger than an outer shape of each light-emitting source 161, and therefore, a portion of wiring board 162 attached to the back surface of reflection sheet 105 is visible through the insertion hole, unevenness in luminance on display panel 103 can be suppressed, because light reflectivity on the surface of wiring board 162 is high.

Light-emitting sources 161 are arranged in a matrix along display panel 103 (along the X axis and the Y axis illustrated in FIG. 3). Light-emitting sources 161 are components that radiate light toward display panel 103 from the back surface side of display panel 103. Although the type of light-emitting sources 161 is not particularly limited in the present disclosure, examples of light-emitting sources 161 include a white LED which is formed by combining a blue light-emitting diode and a fluorescence material emitting yellow and can radiate white light.

Diffusion plate 104 is a member that diffuses light radiated from a plurality of light-emitting sources 161 (point light sources) on a plurality of light-emitting modules 106. For example, diffusion plate 104 diffuses incident light in substantially all directions to reduce viewing angle dependency in luminance of outgoing light, thereby making the luminance of the outgoing light substantially uniform. As one specific example, diffusion plate 104 is a plate-shaped transparent member having fine irregularities on both surfaces or only on one surface. In addition, microparticles having high reflectivity may be dispersed in diffusion plate 104. Further, diffusion plate 104 may be formed by laminating a plurality of films with fine irregularities in layers.

[1-1-2. Reflection Sheet]

Figure 4:
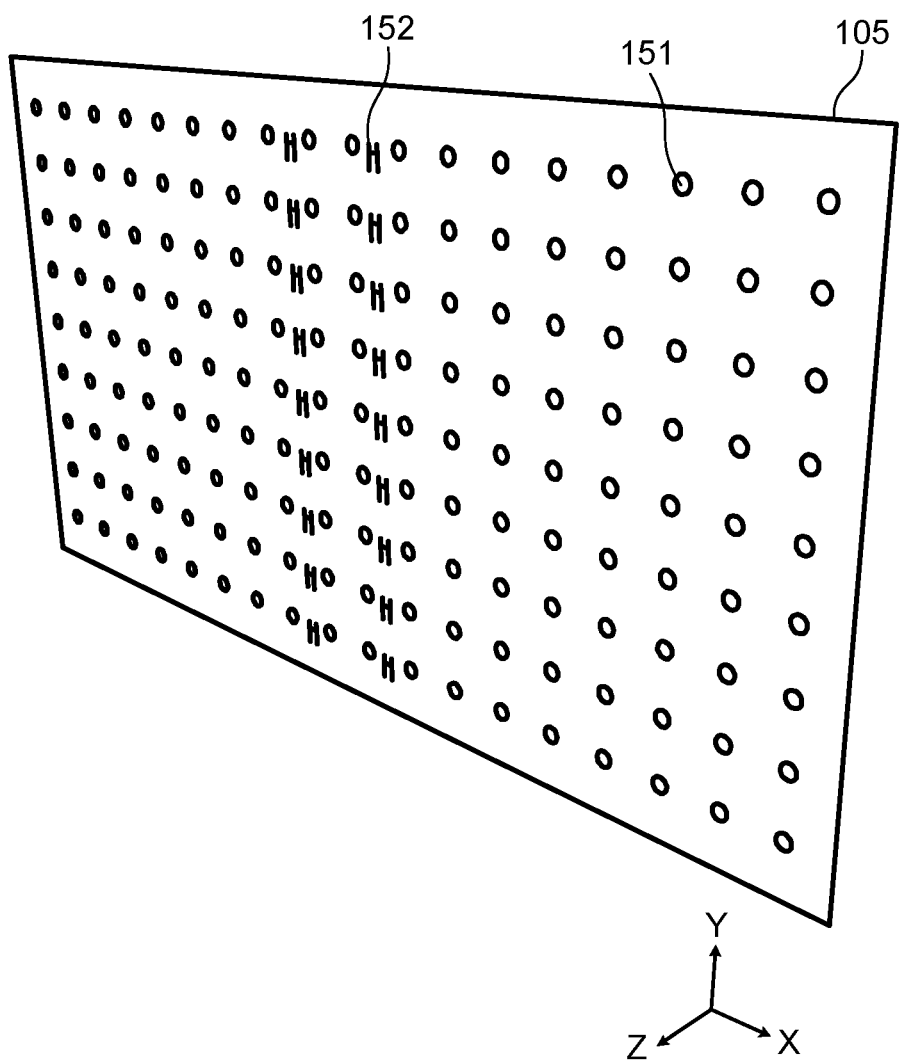
FIG. 4 is a perspective view schematically illustrating one example of a reflection sheet according to the first exemplary embodiment.

FIG. 4 is a perspective view schematically illustrating one example of reflection sheet 105 according to the first exemplary embodiment. FIG. 4 illustrates reflection sheet 105 before being attached to back plate 108.

Reflection sheet 105 is a member that reflects light radiated from light-emitting sources 161 to display panel 103. As illustrated in FIG. 4, reflection sheet 105 is provided with insertion holes 151 into which light-emitting sources 161 are inserted respectively. On reflection sheet 105, each insertion hole 151 is formed on a position corresponding to each light-emitting source 161 arranged on back plate 108. Note that the diameter of each insertion hole 151 may be set to be larger than the outer shape of each light-emitting source 161 so that light-emitting source 161 can be easily inserted into insertion hole 151.

In the present disclosure, the material of reflection sheet 105 is not particularly limited. For example, a white sheet-shaped member made of synthetic resin such as polyethylene terephthalate (PET) having excellent light reflectivity can be used as reflection sheet 105. In addition, reflection sheet 105 has flexibility (elasticity) that enables swelling-out (deformable) due to partial pushing-out by protrusions 107 (illustrated in FIGS. 2 and 5).

In addition, as illustrated in FIG. 4, reflection sheet 105 has incisions 152 on positions corresponding to connectors 163 provided on wiring boards 162. Each of incisions 152 is made by forming an H-shaped slit on reflection sheet 105 so that a portion of reflection sheet 105 rises along the slit. Incision 152 has a structure in which an upper part of incision 152 rises by the insertion of connector 163 into incision 152 and a lower part of incision 152 rises by electric line 164. According to this structure, the rising portion of reflection sheet 105 covers at least a portion of connector 163. In addition, the rising portion of reflection sheet 105 covers at least a portion of electric line 164 with the occurrence of wrinkles being reduced.

As described above, in the present exemplary embodiment, incisions 152 are formed on portions of reflection sheet 105 corresponding to connectors 163. With this configuration, portions of reflection sheet 105 bulge out toward display panel 103 by connectors 163 protruding from wiring boards 162. Thus, the occurrence of unevenness in luminance of light radiated to display panel 103 can be prevented. In addition, due to the configuration in which incisions 152 corresponding to connectors 163 are formed on reflection sheet 105, the exposure of connectors 163 on the surface of reflection sheet 105 can be suppressed, and unevenness in luminance caused by connectors 163 can also be prevented. This is also applied to electric lines 164 connected to connectors 163.

[1-1-3. Back Plate]

Figure 5:
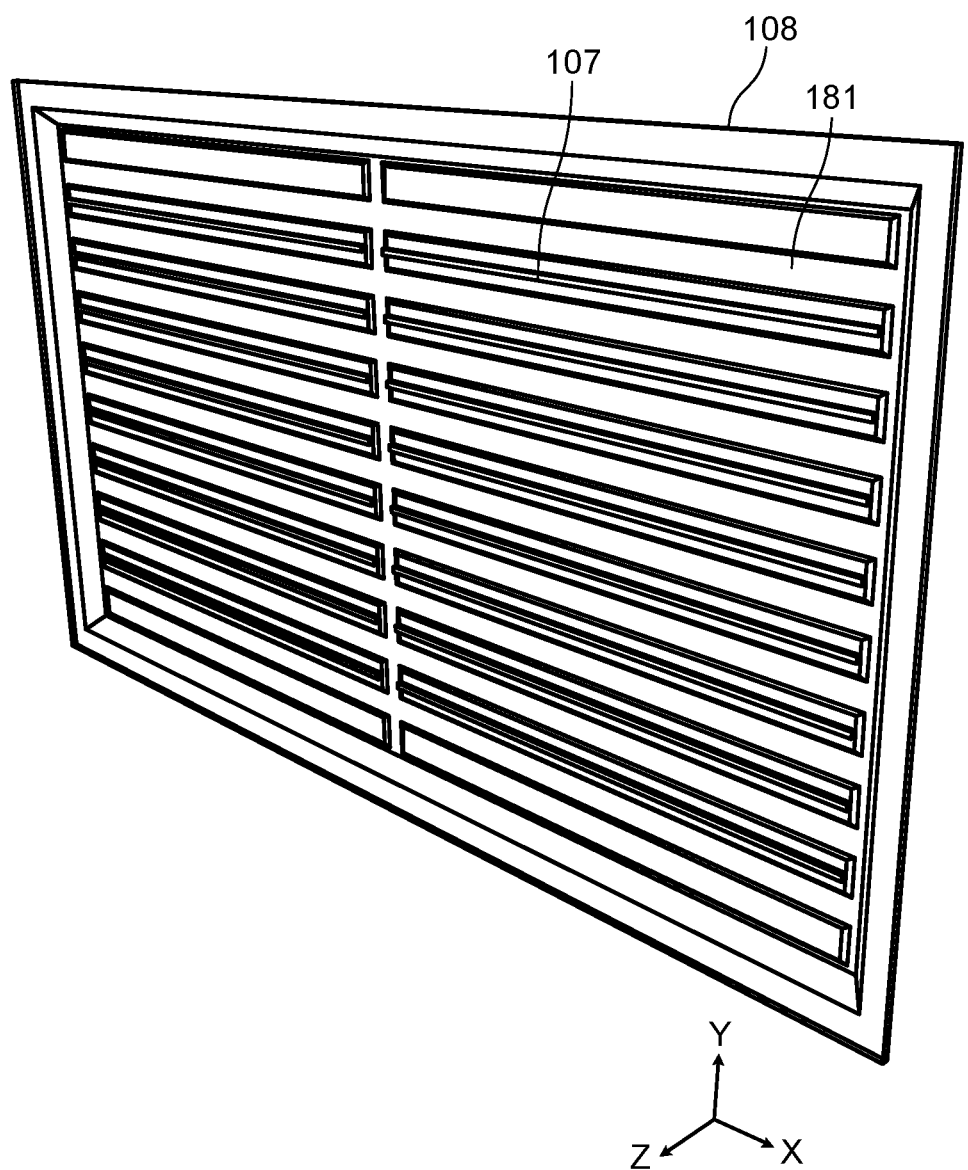
FIG. 5 is a perspective view schematically illustrating one example of a back plate and protrusions according to the first exemplary embodiment.

FIG. 5 is a perspective view schematically illustrating one example of back plate 108 and protrusions 107 according to the first exemplary embodiment.

Back plate 108 is a plate-shaped member that holds display panel 103, and is provided on the back surface (the surface in a negative direction in the Z axis) side of display panel 103 as illustrated in FIG. 2. In addition, back plate 108 holds light-emitting unit 140 between display panel 103 and back plate 108, and holds a circuit board (not illustrated) on the back surface of back plate 108. Back plate 108 is formed by using a metal plate material generally called a "chassis", for example. Further, back plate 108 is formed with irregularities by press working for increasing structural strength.

Back plate 108 in this exemplary embodiment is provided with recessed sections 181 extending in the longer side direction (the X-axis direction) of back plate 108. Wiring boards 162 are placed on recessed sections 181 respectively. In addition, back plate 108 may be provided with bosses for screwing, and the like. Further, back plate 108 may be disposed to cover the entire back surface (or almost the entire back surface) of display panel 103, and may be sometimes configured to dissipate heat generated on display panel 103.

[1-1-4. Protrusion]

As illustrated in FIG. 5, protrusions 107 are rectangular rod-shaped members mounted to back plate 108. Protrusions 107 are mounted to back plate 108, so as to cause portions of reflection sheet 105 to bulge out toward display panel 103. In the present exemplary embodiment, protrusions 107 are attached to a surface of back plate 108 on which reflection sheet 105 is mounted (a surface almost as high as the surfaces of wiring boards 162 on display panel 103 side) so as to protrude toward display panel 103. Protrusions 107 are disposed between light-emitting sources 161 (central position), and extend along a direction in which light-emitting modules 106 extend.

[1-2. Method for Attaching Reflection Sheet]

Figure 6:
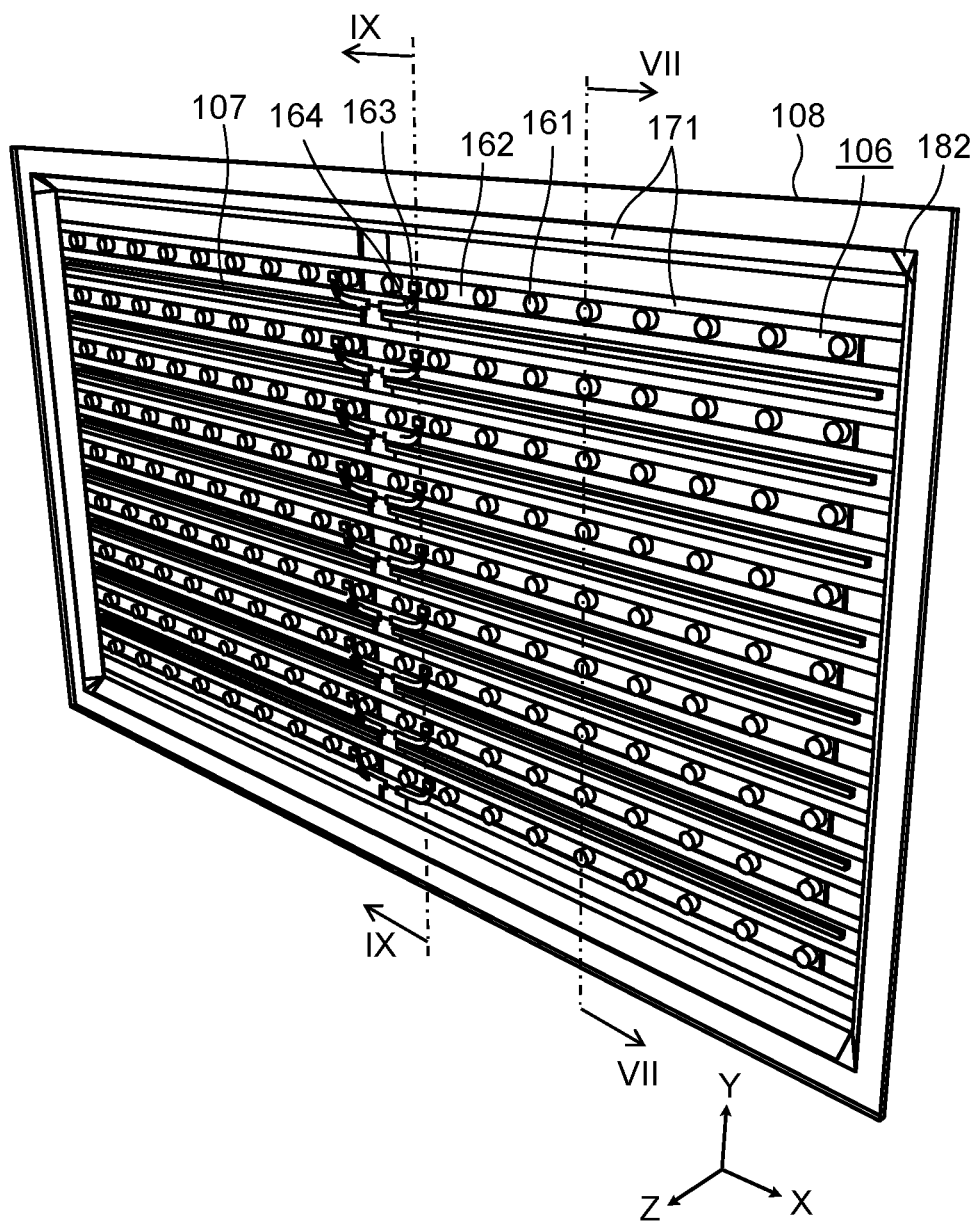
FIG. 6 is a perspective view schematically illustrating one example of the back plate before the reflection sheet is attached thereto in the first exemplary embodiment.

Next, a method for attaching reflection sheet 105 will be described. FIG. 6 is a perspective view schematically illustrating one example of back plate 108 before reflection sheet 105 is attached thereto in the first exemplary embodiment. FIG. 6 illustrates back plate 108 to which light-emitting modules 106 and protrusions 107 are mounted.

Figure 7:
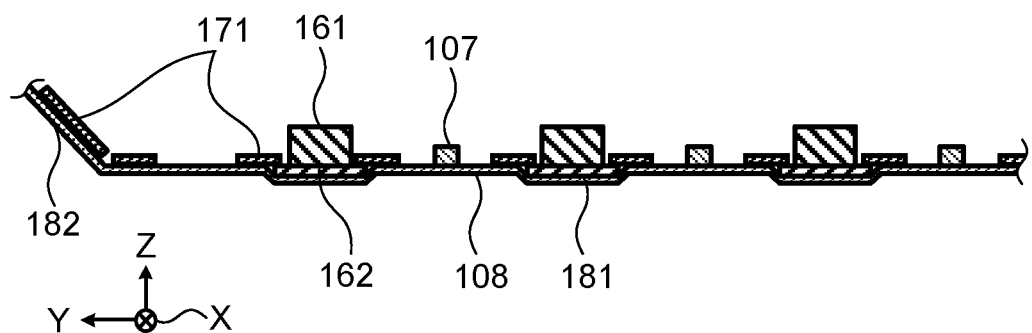
FIG. 7 is a sectional view illustrating the back plate before the reflection sheet is attached thereto in the first exemplary embodiment.

FIG. 7 is a sectional view of back plate 108 before reflection sheet 105 is attached thereto in the first exemplary embodiment. FIG. 7 illustrates a portion of the cross-section taken along line VII-VII in FIG. 6.

As illustrated in FIGS. 6 and 7, light-emitting modules 106 are disposed on back plate 108 in a state in which wiring boards 162 are fitted to recessed sections 181 on back plate 108 respectively. The surfaces of wiring boards 162 on display panel 103 side are approximately flush with the surface of back plate 108 on which protrusions 107 are mounted. In this state, light-emitting sources 161 are arranged in a matrix with respect to back plate 108.

In addition, back plate 108 is provided with attachment member 171 for attaching reflection sheet 105. Attachment member 171 is a band-like double-sided tape, for example. However, attachment member 171 is not particularly limited to a double-sided tape. Any member can be used as attachment member 171, so long as it can attach reflection sheet 105. Attachment member 171 is attached to back plate 108 with it extending almost throughout the longer side direction (the X-axis direction in the drawing) of back plate 108. By way that attachment member 171 is mounted along the longer side direction of back plate 108 as described above, the possibility that attachment member 171 or reflection sheet 105 is peeled from back plate 108 can be reduced if back plate 108 or reflection sheet 105 which has been attached to back plate 108 is expanded/contracted due to heat (hereinafter also referred to as "thermally expanded/contracted").

Attachment member 171 is also provided near light-emitting sources 161. According to this configuration, when back plate 108 or attached reflection sheet 105 are thermally expanded/contracted, the occurrence of a phenomenon in which light-emitting sources 161 are deviated relatively to wiring boards 162 or fall from wiring boards 162 can be suppressed.

In addition, a portion of attachment member 171 is provided across wiring board 162 and back plate 108. According to this configuration, the possibility that attachment member 171 is peeled when wiring boards 162 are thermally expanded/contracted can be reduced.

Further, attachment member 171 is also mounted to inclined section 182 present on a peripheral edge of back plate 108. Inclined section 182 is a peripheral edge part of back plate 108 and is configured to be increasingly closer to display panel 103 toward an end of the peripheral edge. In other words, inclined section 182 is a peripheral edge part of back plate 108 and is configured such that an opening area becomes larger according as the opening is near to display panel 103. Thus, the peripheral edge of reflection sheet 105 is attached and fixed to inclined section 182, so that the shape of reflection sheet 105 after being attached can be stabilized, and therefore, unevenness in luminance of light radiated to display panel 103 can be suppressed.

Figure 8:
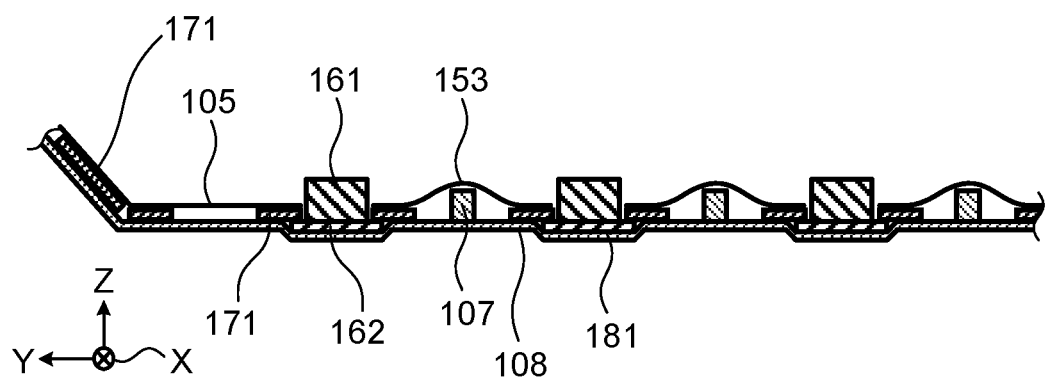
FIG. 8 is a sectional view illustrating the back plate to which the reflection sheet is attached in the first exemplary embodiment.

FIG. 8 is a sectional view illustrating back plate 108 to which reflection sheet 105 is attached in the first exemplary embodiment. FIG. 8 illustrates the state in which reflection sheet 105 is attached to the back plate illustrated in the sectional view of FIG. 7.

As illustrated in FIG. 8, reflection sheet 105 is attached to wiring boards 162 and back plate 108 by attachment member 171 with light-emitting sources 161 are inserted into insertion holes 151 respectively. In this case, since protrusions 107 protrude toward display panel 103 more than the surface on which attachment member 171 is mounted, reflection sheet 105 partially bulges out toward display panel 103 due to its own expansion/contraction property. Thus, bulging sections 153 are formed on reflection sheet 105. Protrusions 107 are disposed between light-emitting sources 161 and light-emitting sources 161 along the longer side direction of back plate 108. Therefore, in this exemplary embodiment, bulging sections 153 on reflection sheet 105 extend along the longer side direction of back plate 108 and bulge out toward display panel 103 in a semi-cylindrical shape.

If bulging section 153 is not formed, a dark region may be caused in light radiated toward display panel 103. However, by way that bulging sections 153 on reflection sheet 105 are formed between light-emitting sources 161 and light-emitting sources 161, luminance in a dark region, which may be caused if bulging section 153 is not formed, can be increased. Thus, display device 100 in this exemplary embodiment can make luminance of light radiated to display panel 103 substantially uniform with the luminance being kept high.

Figure 9:
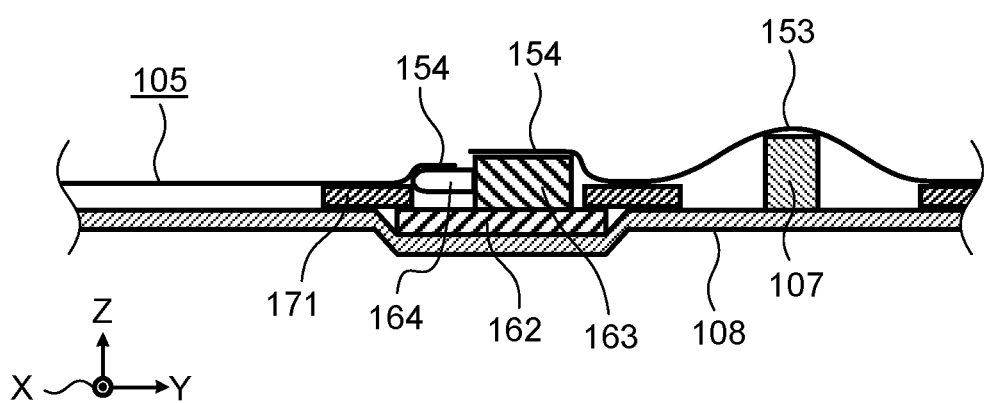
FIG. 9 is a sectional view illustrating the back plate to which the reflection sheet is attached in the first exemplary embodiment.

FIG. 9 is a sectional view illustrating back plate 108 to which reflection sheet 105 is attached in the first exemplary embodiment. FIG. 9 illustrates a portion of a cross-section (a cross-section in the state in which reflection sheet 105 is attached) along line IX-IX passing through connector 163 in FIG. 6.

As illustrated in FIG. 9, in the state in which reflection sheet 105 is attached to back plate 108, connector 163 is covered by tongue section 154 formed by incision 152 formed on the position on reflection sheet 105 corresponding to connector 163. Electric line 164 to be connected to connector 163 is also covered by tongue section 154.

If connector 163 and electric line 164 are exposed on the surface of reflection sheet 105, a dark region may be caused in light radiated toward display panel 103 on the position where connector 163 is mounted. However, due to the configuration in which connector 163 and electric line 164 are covered by tongue section 154, the luminance in the dark region caused on the position where connector 163 is mounted can be increased. Thus, display device 100 in this exemplary embodiment can make luminance of light radiated to display panel 103 substantially uniform with the luminance being kept high.

[1-3. Effects and the Like]

As described above, in the present exemplary embodiment, the display device includes a display panel that displays an image, a plurality of light-emitting sources, a back plate to which the light-emitting sources are mounted, and a reflection sheet. The plurality of light-emitting sources radiates light toward the display panel from a back surface side of the display panel, and is arranged in a matrix along the display panel. The reflection sheet is attached to the back plate, provided with insertion holes into which the light-emitting sources are inserted, and reflects light radiated from the light-emitting sources. The back plate has a plurality of protrusions that causes portions of the reflection sheet to bulge out toward the display panel with the reflection sheet being attached to the back plate.

Note that display device 100 is one example of the display device. Display panel 103 is one example of the display panel. light-emitting source 161 is one example of the light-emitting source. Back plate 108 is one example of the back plate. Reflection sheet 105 is one example of the reflection sheet. Insertion hole 151 is one example of the insertion hole. Protrusion 107 is one example of the protrusion.

In display device 100, when bulging sections 153 due to protrusions 107 are not formed on reflection sheet 105, a dark region may be caused in light radiated toward display panel 103. However, in display device 100 described exemplary in the first exemplary embodiment, for example, bulging sections 153 are formed on reflection sheet 105 due to protrusions 107, so that the luminance of the dark region, which may be caused in light radiated toward display panel 103, can be increased. Thus, luminance of light radiated to display panel 103 can be made to be substantially uniform with the luminance being kept high.

In the display device according to this embodiment, the back plate may further have a connector for supplying electric power to the light-emitting sources, and the reflection sheet may be provided with an incision that forms a tongue section for covering the connector.

Note that connector 163 is one example of the connector. Tongue section 154 is one example of the tongue section. Incision 152 is one example of the incision.

In display device 100, when connector 163 is not covered by tongue section 154, a dark region may be caused in light radiated toward display panel 103 on the position where connector 163 is mounted. However, in display device 100 described exemplary in the first exemplary embodiment, for example, reflection sheet 105 is provided with the incision, so that connector 163 is covered by tongue section 154. Thus, in display device 100, the luminance in a dark region, which may be caused in light radiated toward display panel 103 on the position where connector 163 is mounted, can be increased, and thus the luminance of light radiated to display panel 103 can be made substantially uniform with the luminance being kept high.

In the display device according to this exemplary embodiment, the back plate may have, on a peripheral edge part, an inclined section which is increasingly closer to the display panel toward an end of the peripheral edge, and the reflection sheet may be attached to the inclined section.

Note that inclined section 182 is one example of the inclined section.

Thus, in display device 100 described exemplary in the first exemplary embodiment, for example, since the peripheral edge part of reflection sheet 105 is attached and fixed to inclined section 182, the shape of reflection sheet 105 after being attached can be stabilized, and therefore, unevenness in luminance of light radiated to display panel 103 can be suppressed.

In the display device according to this exemplary embodiment, the back plate may further have a wiring board on which the plurality of light-emitting sources is mounted, and the reflection sheet may be attached to the wiring board near the light-emitting sources.

Note that wiring board 162 is one example of the wiring board.

Thus, in display device 100 described exemplary in the first exemplary embodiment, for example, light-emitting sources 161 can be easily arranged on back plate 108 in a matrix, for example. Further, when back plate 108 or reflection sheet 105 is thermally expanded/contracted, the possibility that light-emitting sources 161 are deviated relatively to wiring board 162 or fall from wiring board 162 can be reduced.

In the display device according to this exemplary embodiment, an attachment section to which the reflection sheet and the wiring board are attached may be formed to extend in the longer side direction of the display panel.

Note that attachment member 171 is one example of the attachment section.

For example, in display device 100 described exemplary in the first exemplary embodiment, attachment member 171 is disposed along the longer side direction of back plate 108. This configuration can reduce the possibility that attachment member 171 or reflection sheet 105 is peeled from back plate 108 when back plate 108 or reflection sheet 105 is thermally expanded/contracted.

Other Exemplary Embodiments

As presented above, the first exemplary embodiment has been described as an example of the technique disclosed in the present application. However, the technology in the present disclosure is not limited to this, and is applicable to embodiments to which modification, replacement, addition, omission, or the like is made. In addition, the constituent elements described in the first exemplary embodiment can be combined to form a new embodiment.

In view of this, other exemplary embodiments will be described below.

The first exemplary embodiment has described that protrusions 107 are separate members from back plate 108. However, protrusions 107 and back plate 108 may be integral.

Attachment member 171 is not limited to a double-sided tape. Attachment member 171 may be a type of an adhesive to be applied. In addition, attachment member 171 may be attached in any direction. For example, attachment member 171 may be provided along a shorter side direction of back plate 108.

In addition, a mark indicating the position where attachment member 171 is to be provided may be formed on wiring board 162 by screen printing or the like.

Protrusion 107 is not limited to a linear protrusion. Protrusion 107 may protrude in a dotted manner. When protrusion 107 protrudes in a dotted manner, bulging section 153 on reflection sheet 105 may have a dome shape.

As presented above, the exemplary embodiments have been described as an example of the technique in the present disclosure. For this purpose, the accompanying drawings and the detailed description are provided.

Therefore, the components in the accompanying drawings and the detail description may include not only components essential for solving problems, but also components that are provided to illustrate the above described technique and are not essential for solving problems. Therefore, such inessential components should not be readily construed as being essential based on a fact that such inessential components are shown in the accompanying drawings or described in the detailed description.

Further, the above described embodiments have been described to exemplify the technique according to the present disclosure, and therefore, various modification, replacement, addition, and omission, and the like may be made within the scope of the claims and an equivalent scope of the claims.

INDUSTRIAL APPLICABILITY

The present disclosure is applicable to a display device that displays images, characters, moving images, and the like, using a backlight. Specifically, the present disclosure is applicable to an electronic device such as a television, monitor display, digital signage, mobile terminal, tablet terminal, or table-type display device.

REFERENCE MARKS IN THE DRAWINGS

100: display device
101: frame
102: front member
103: display panel
104: diffusion plate
105: reflection sheet
106: light-emitting module
107: protrusion
108: back plate
109: back cover
140: light-emitting unit
151: insertion hole
152: incision
153: bulging section
154: tongue section
161: light-emitting source
162: wiring board
163: connector
164: electric line
171: attachment member
181: recessed section
182: inclined section

The invention claimed is:

1. A display device comprising:
a display panel that displays an image;
a plurality of light-emitting sources that radiates light toward the display panel from a back surface side of the display panel, and is arranged in a matrix along the display panel;
a back plate where the light-emitting sources are mounted; and
a reflection sheet that is attached to the back plate, provided with insertion holes, and reflects light radiated from the light-emitting sources, the light-emitting sources being inserted into the insertion holes respectively, wherein:

the back plate has a plurality of protrusions that causes portions of the reflection sheet to bulge out toward the display panel with the reflection sheet being attached to the back plate, and each of the plurality of protrusions is fully covered by the reflection sheet.

2. The display device according to claim 1, wherein the back plate further has a connector for supplying electric power to the light-emitting sources, and the reflection sheet is provided with an incision that forms a tongue section for covering the connector.

3. The display device according to claim 1, wherein the back plate has, on a peripheral edge part, an inclined section that is increasingly closer to the display panel toward an end of a peripheral edge, and the reflection sheet is attached to the inclined section.

4. The display device according to claim 1, wherein the back plate further has a wiring board where the plurality of light-emitting sources is mounted, and the reflection sheet is attached to the wiring board near the light-emitting sources.

5. The display device according to claim 4, wherein an attachment section where the reflection sheet and the wiring board are attached is formed to extend in a longer side direction of the display panel.

\* \* \* \* \*